July 12, 1927.

C. ADAMSKY 1,635,165

BOOK OR PAMPHLET TRIMMING DEVICE

Filed Jan. 21, 1924    5 Sheets-Sheet 1

INVENTOR.
Cornelius Adamsky

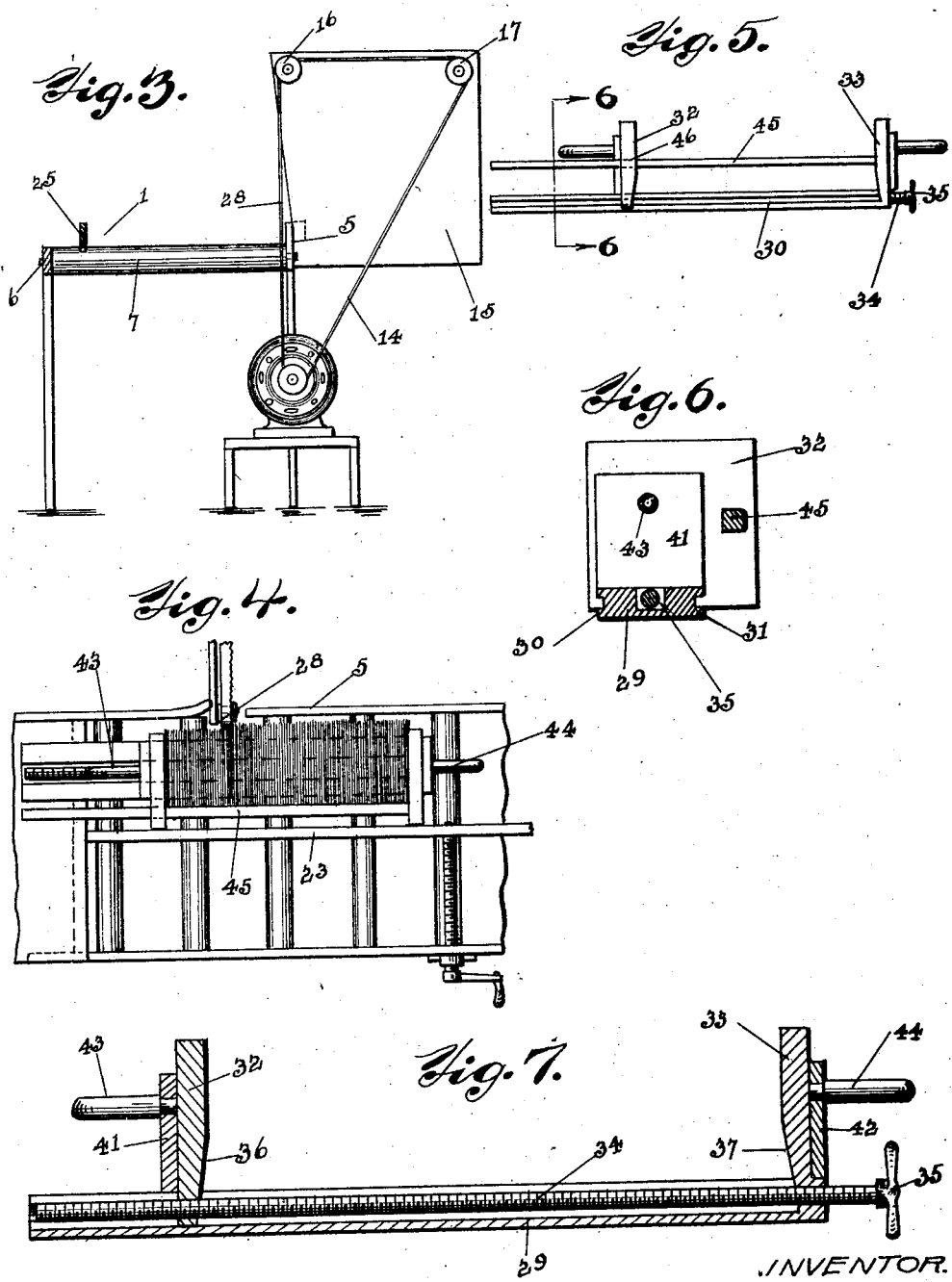

July 12, 1927.
C. ADAMSKY
BOOK OR PAMPHLET TRIMMING DEVICE
Filed Jan. 21, 1924
1,635,165
5 Sheets-Sheet 3
Fig. 8.
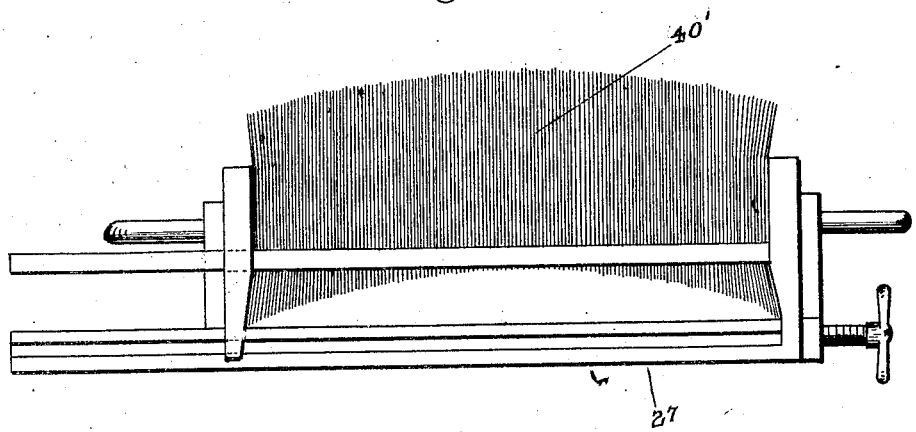
Fig. 9.
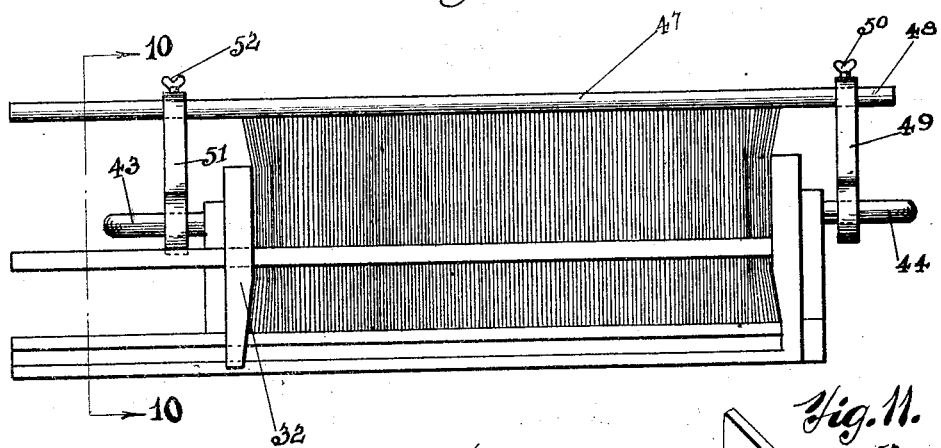
Fig. 10.
Fig. 11.
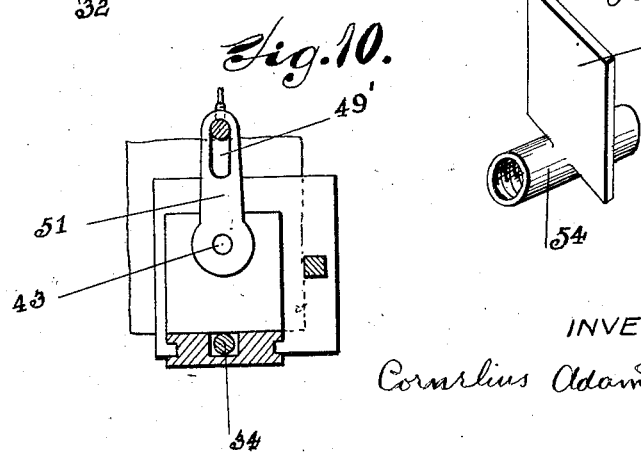
INVENTOR.
Cornelius Adamsky July 12, 1927.  C. ADAMSKY  1,635,165
BOOK OR PAMPHLET TRIMMING DEVICE
Filed Jan. 21, 1924   5 Sheets-Sheet 4

INVENTOR.
Cornelius Adamsky

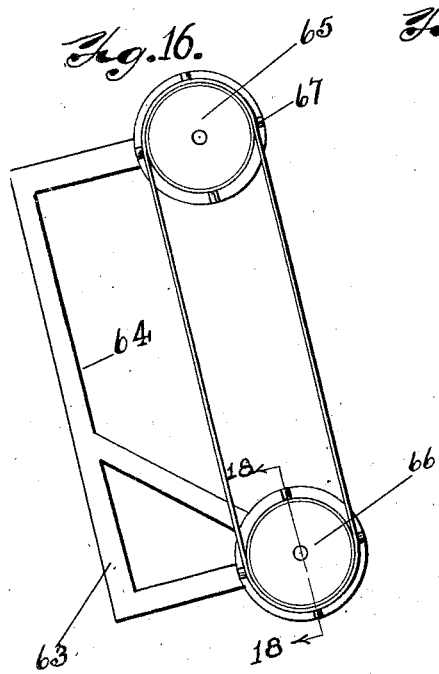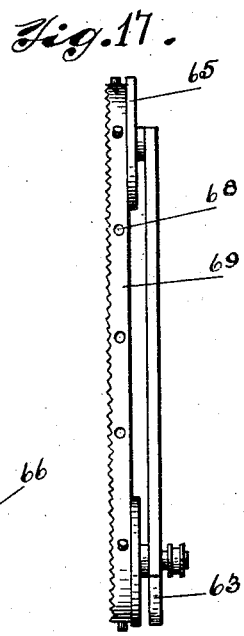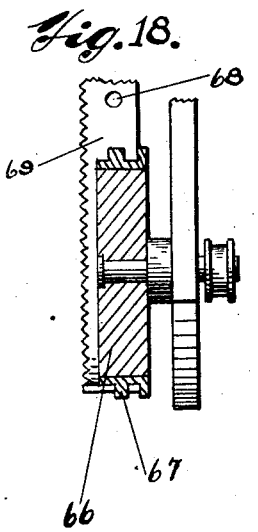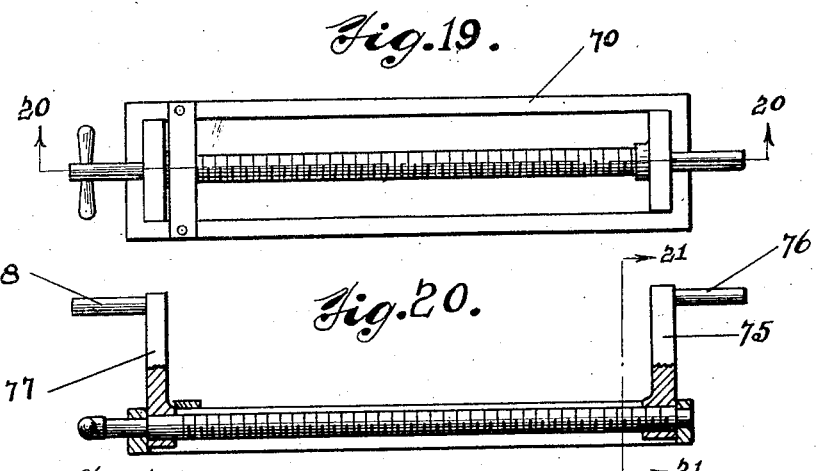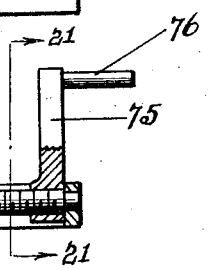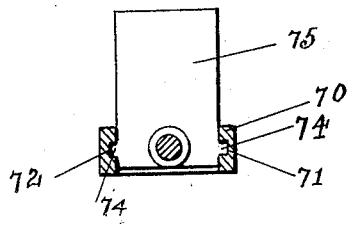

Patented July 12, 1927.

1,635,165

UNITED STATES PATENT OFFICE.

CORNELIUS ADAMSKY, OF CINCINNATI, OHIO.

BOOK OR PAMPHLET TRIMMING DEVICE.

Application filed January 21, 1924. Serial No. 687,525.

This invention relates to improvements in book or pamphlet trimming devices and has for its object to provide means to provide the same with deckle like edges in the trimming process.

Another object of the invention is to provide a pamphlet trimming machine embracing a trimming saw and a pamphlet clamp and carriage and means for regulating the same relative to the saw.

A further object of the invention is to provide means for trimming pamphlets with an ordinary deckle edge.

With the above and such other objects in view as may hereinafter more fully appear, I have invented the device illustrated in the accompanying drawings in which:

Figure 3 is an end elevational view;

Figure 4 is a top plan view of the machine shown in operation, partly broken away;

Figure 5 is a detail view of a clamp;

Figure 6 is a section on line 6—6 thereof;

Figure 7 is a longitudinal, sectional view of the clamp on an enlarged scale;

Figure 8 is an elevational view similar to Figure 5, on a large scale, and showing pamphlets engaged by the clamp;

Figure 9 is a similar view showing an attachment for preventing buckling of the stack of pamphlets;

Figure 10 is a section on line 10—10, of Figure 9;

Figure 11 is a perspective view of a modified form of clamp jaw;

Figure 16 is a modified form of band saw carriage used with the device;

Figure 17 is an edge view thereof;

Figure 18 is an enlarged section on line 18—18, of Figure 16;

Figure 19 is a plan view of a modified form of pamphlet clamp;

Figure 20 is a section on line 20—20 thereof; and

Figure 21 is a section on line 21—21 of Figure 20.

Figure 1:
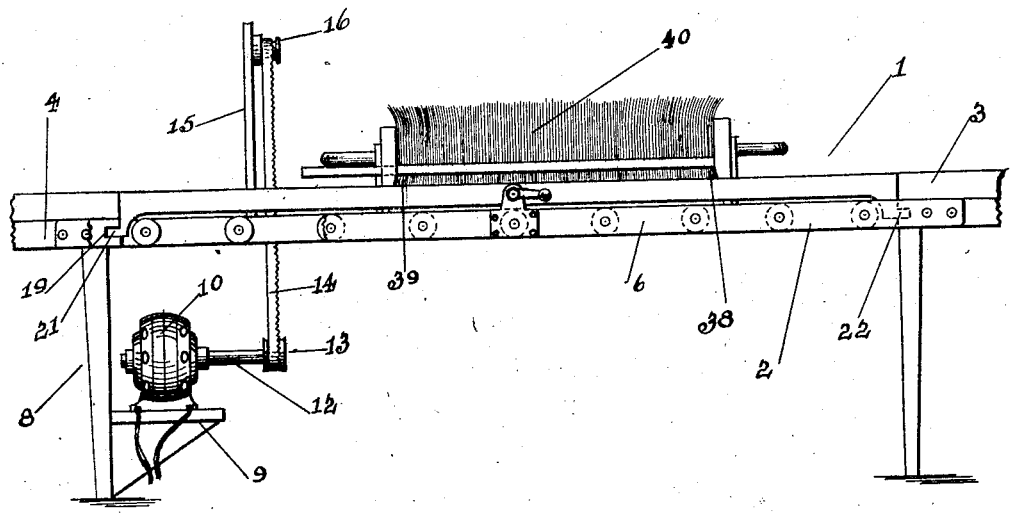
Figure 1 is an elevational view of my machine.

Like reference characters indicate like parts throughout the following specification, and in the several views in the drawings in which 1 indicates a pamphlet trimming machine having means for providing imitation deckle edges and consists of a stand 2 embracing deckle ends 3 and 4 and side pieces 5 and 6 between which are mounted a series of suitably spaced apart rollers 7.

Figure 2:
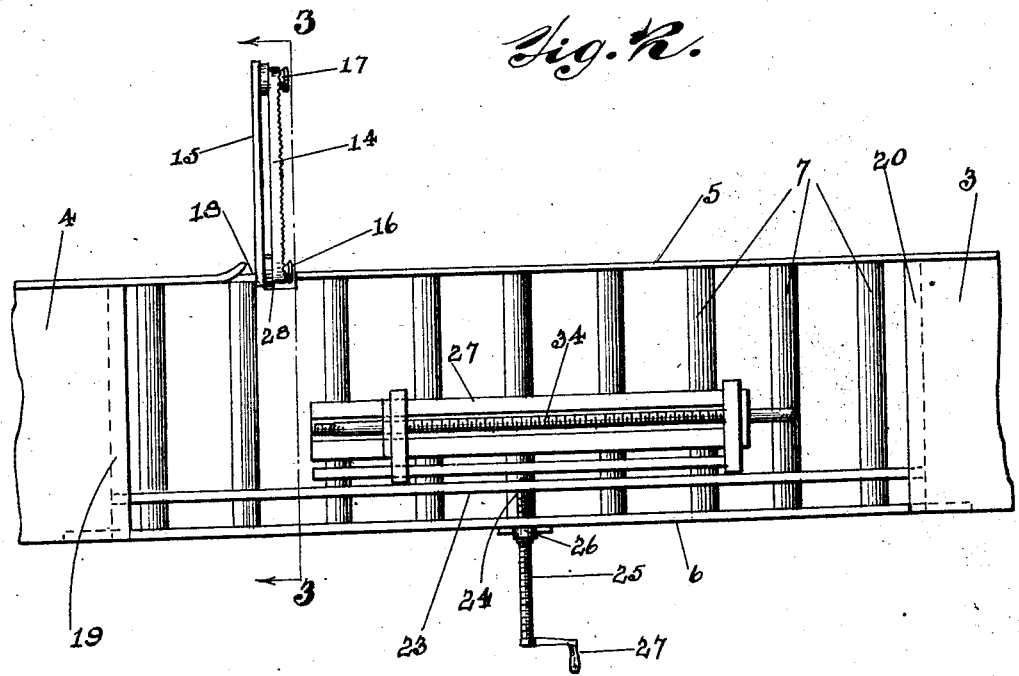
Figure 2 is a top plan view thereof.
Figure 12:
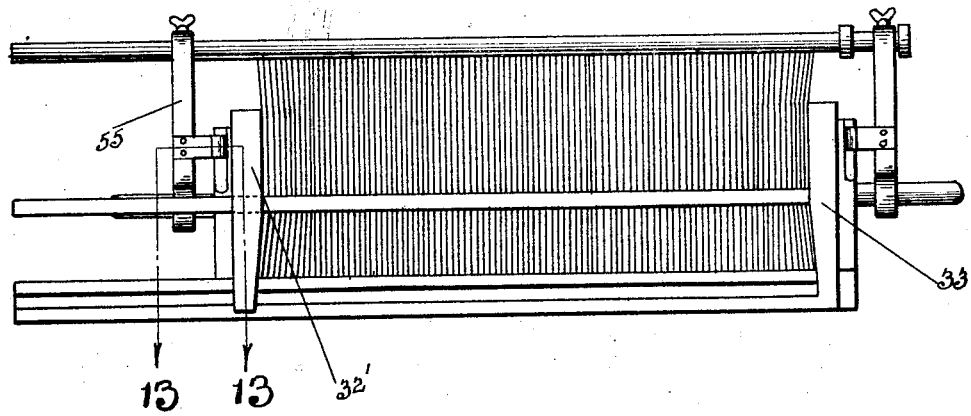
Figure 12 is a view similar to Figure 9, showing a modified form of a leveling rod holder.
Figure 13:
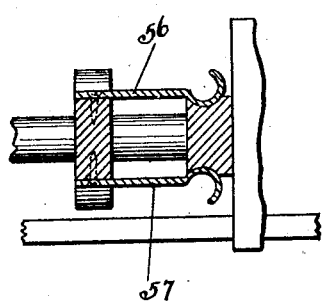
Figure 13 is a section on line 13—13 of Figure 12.
Figure 14:
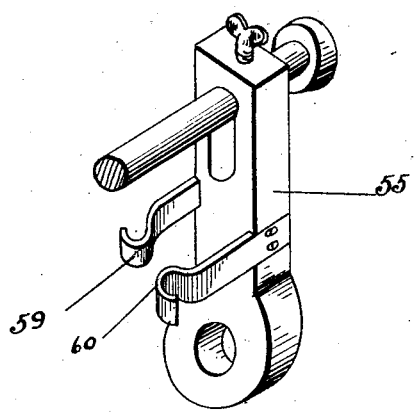
Figure 14 is a detail, perspective view of a rod holder.
Figure 15:
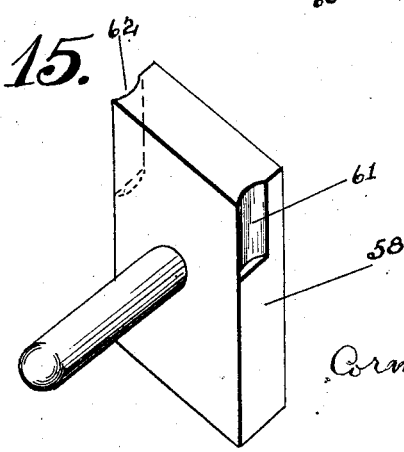
Figure 15 is a detail, perspective view of a carrier or handle member.

Under the table end 4 is a leg 8, which has mounted thereon a shelf 9 upon which a motor 10 is seated, said motor having a shaft 11 with a pulley 13 over which the band saw 14 operates. A frame work 15 is mounted on or adjacent the rail 5 on the upper end of which are provided pulleys 16 and 17 over which the saw 14 operates. The rail 5 is broken away at 18, to permit the saw 14 to extend therethrough, as indicated in Figures 2 and 4. The ends 3 and 4 are provided with grooved members 19 and 20, which form trackways in which are slidably mounted the tongue flanges 21 and 22 of the adjustment rail 23 to the center of which rail is swiveled the end 24 of a screw 25, which is threaded through a bearing 26, secured to said rail 6. This screw is provided with a crank handle 27 by means of which the rail 23 may be operated toward either the rail 5 or 6, in order that said rail 23 and the rail 5 will form a passageway between which the pamphlet clamp 27 may be operated toward the inwardly projecting portion 28 of said saw 14.

The clamp 27 consists of a base 29, having longitudinal grooved edges 30 and 31, in which grooves tongues on the lower ends of the movable jaw 32 operate. 33 is a fixed jaw member projecting through the lower edge of which is a screw rod 34, which operates in a longitudinal recess 35 in said member 29, the movement of said jaw 32 being controlled by said rod 34. The rod 34 is provided with a T-shaped head 35, by means of which it may be easily operated.

The jaw members 32 and 33 have outwardly inclined lower portions 36 and 37 in order that the bottom edges 38 and 39, of the stack of pamphlets 40, may project therein in order to lock the stack within the clamp. The jaws 32 and 33 are provided with plates 41 and 42 on which are mounted handles 43 and 44, in order that after a stack of pamphlets has been secured within the clamp the clamp may be easily picked up bodily and placed upon the roller bed of the machine 1.

Fixed to the rear edge of the jaw 33, is a rod 45, which slidably projects through an aperture 46 in the jaw 32 against which rod the backs of the pamphlets are stacked.

Figure 8 illustrates a clamp 27 with a stack of pamphlets therein and it will be noted that the said pamphlets 40' are shown buckled, this buckling being caused through the necessity of having to bind the pamphlets very close together. In Figure 9, I have shown a modification of the invention which overcomes this difficulty. In this form of the invention I provide a buckle preventing rod 47 the end 48 of which is mounted in the bearing member 49, the upper end of which has a slot 49' through which the rod projects and in which it is held by means of a thumb screw 50. The member 45 is also provided with an aperture threaded on the handle 44 which forms a support for said bearing member. On the handle 43 is mounted a similar bearing 51. After the clamp has been tightened to a desired extent, the set screw 52 is screwed down, by means of which the rod 47 is adjusted to the height of the pamphlets being trimmed.

In Figure 11 I show a slight modification of the movable clamp jaw. In this form of the invention the jaw 53 is fixed or integrally formed on the internally, screw threaded collar 54, which may be threaded upon the screw 34 in place of the clamp 32. This jaw is for pamphlets of a smaller size than those held in the clamp of Figures 8 and 9.

Figures 12, 13, 14 and 15, illustrate another modification of a pamphlet retaining device and in which the retaining rod bearing members 55, are provided with spring clips 56 and 57 which are adapted to engage the holder plate 58, the heads 59 and 60 of said clips seating in the grooves 61 and 62 of said member 58 in order that as the jaw 32' moves toward the jaw 33, the member 55 will be drawn along with the same.

In Figures 16, 17 and 18, I show a modified form of band saw support in which the frame 63 is provided upon the opposing ends of the U-member 64, on which are mounted the sprocket wheels 65 and 66, the said wheels being provided with pins 67 adapted to engage into the apertures 68, of the band saw 69, whereby said saw is positively driven and there is no possible danger of slipping, thus obviating jamming of the work upon the saw and non-uniform work.

In Figures 19, 20 and 21, I show a modified form of clamp in which the frame 70 is provided with longitudinal inner grooves 71 and 72 in which the tongues 73 and 74 of the movable jaw 75 operate. The jaw 75 is provided with an outwardly projecting handle 76 and a fixed jaw 77 is provided with a similar handle 78.

Having described the invention, that which I claim and desire to procure by Letters Patent is:—

1. A paper trimming device embracing a table, a band saw connected therewith, a carriage operable on the table to pass said saw, said table having rollers over which said carriage operates, means for clamping a stack of paper on said table, means for preventing the buckling of said stack, said means consisting of a rod mounted over said stack.

2. Claim 1 and—means for supporting said rod.

3. A paper trimming device embracing a table, a band saw connected therewith, a carriage operable on the table to pass said saw, said table having rollers over which said carriage operates, means comprising jaws for clamping a stack of paper on said table, means for preventing the buckling of said stack, said means consisting of a rod mounted over said stack, and means for supporting said rod, said means consisting of bearing members, and handles on said jaws upon which said bearing members are mounted.

4. Claim 3 and—means whereby one of said bearing members may be caused to move with said movable jaw, said latter means consisting of clips connecting said bearing member with said movable jaw.

In testimony whereof I affix my signature.

CORNELIUS ADAMSKY.